United States Patent [19]
Dietrich

[11] Patent Number: 5,386,799
[45] Date of Patent: Feb. 7, 1995

[54] TEAT CUP HAVING CLEANING FLUID LINE BRANCHING THEREFROM ADJACENT CONNECTION WITH MILK LINE

[76] Inventor: Berthold J. T. Dietrich, Rietdekkerweg 25, 7213 XM Gorssel, Netherlands

[21] Appl. No.: 976,919

[22] Filed: Nov. 19, 1992

[30] Foreign Application Priority Data

Nov. 22, 1991 [NL] Netherlands ............... 9101961

[51] Int. Cl.⁶ ................................. A01J 5/06
[52] U.S. Cl. ......................... 119/14.51; 137/872
[58] Field of Search ........... 119/14.47, 14.18, 14.51, 119/14.01, 14.02; 137/872; 134/166 C, 166 R, 169 C, 171

[56] References Cited

U.S. PATENT DOCUMENTS

| | | | |
|---|---|---|---|
| 3,461,845 | 8/1969 | Peterson | 119/14.18 |
| 4,168,677 | 9/1979 | Brown | 119/14.18 |
| 4,175,514 | 11/1979 | Souza et al. | 119/14.18 |
| 4,462,425 | 7/1984 | Mehus | 119/14.18 |
| 4,572,105 | 2/1986 | Chowdhury et al. | 119/14.18 |
| 4,924,809 | 5/1990 | Verbrugge | 119/14.02 |
| 5,167,201 | 12/1992 | Peles | 119/14.18 |

FOREIGN PATENT DOCUMENTS 1017567  1/1966  United Kingdom ........... 119/14.18

Primary Examiner—Gene Mancene
Assistant Examiner—Todd E. Manahan
Attorney, Agent, or Firm—Edmund M. Jaskiewicz

[57] ABSTRACT

A device for pneumatic milking of cows comprises a system of teat cups which are connected to a milk line, each cup being provided with a connection to a source of alternating vacuum. The milk line (7) from each teat cup (2) at a point near the liner (5) is provided with a branch (9) which is connected by way of a shut-off valve (10) to a line (11) for the supply of a cleaning medium. Method after cleaning a system of teat cups of a device for pneumatic milking of cows after removal of the teat cups from a cow (3), is also disclosed on ending of a milking operation, the inside of each of the teat cups (2) is flushed with a flushing fluid. The teat cups (2) are flushed with their open end (6) downwards.

10 Claims, 2 Drawing Sheets

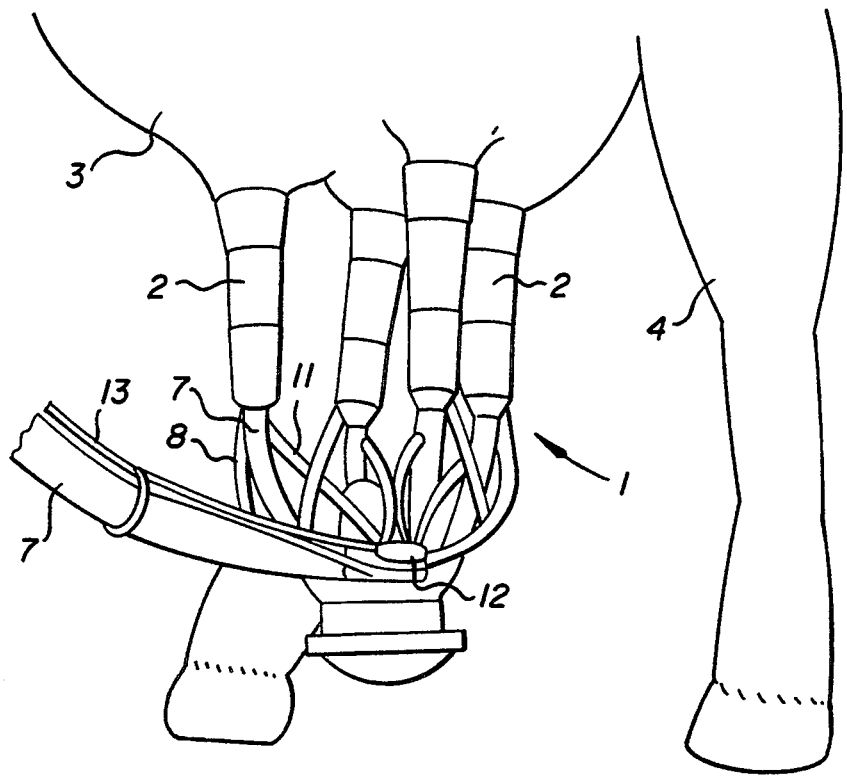
FIG. 1
FIG. 2
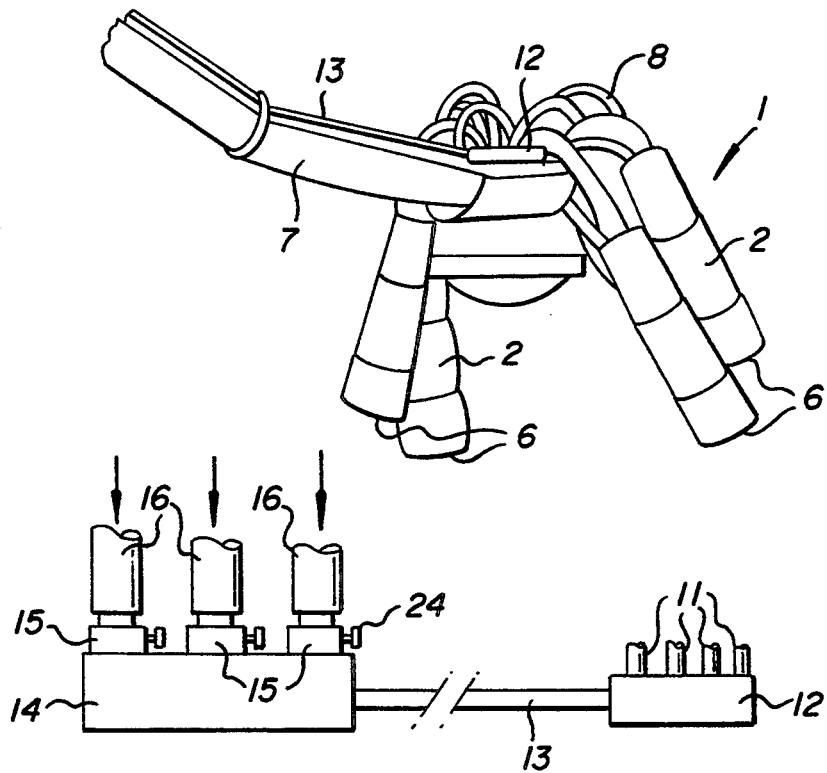
FIG. 4

TEAT CUP HAVING CLEANING FLUID LINE BRANCHING THEREFROM ADJACENT CONNECTION WITH MILK LINE

FIELD OF THE INVENTION

The invention relates to a device for pneumatic milking of cows, comprising a system of teat cups which are each provided with a liner which is open at one end and at the other end is connected to a milk line, each cup being provided with a connection to a source of alternating vacuum. Such a device has already been known in practice for many years, and is also in general use.

The cup system here generally comprises four cups, the liner of which is integral with at least a first fixed part of a milk line. These parts lead to a collection unit to which the main milk line (with the pulsating pressure) is also connected. Such a cup system is made to interact with the teats of the udder of a cow to be milked. As soon as the milking has been finished, the teat cups are detached, and the whole unit is placed in a rest position in the operator's working pit. In this position, each teat cup is suspended upside down and the milk residues are able to collect in the mouth of the cup liner.

DESCRIPTION OF THE RELATED ART

A method and a device for disinfecting the interior of a teat cup on completion of the milking cycle, at the time when the teats of the cow's udder are still in the teat cups, are known per se from German Patent Application DE 2,622,794. According to the theory described in that patent, the teat must be cleaned well and disinfected when the milking operation has been completed. However, this method and device have the great disadvantage that when the teat cups are used for milking the next cow the inside of the teat cups still contains disinfectant fluid. Besides, the teat cup is only cleaned in part, namely the part which is freely accessible to the disinfecting fluid at the time when the teat is still in the teat cup.

It has, however, been found that when the teat cups are removed from the cow and the teat cups are then hanging down in order to shut off the milk discharge from the teat cups, milk residues collect in the liner near the open end of each teat cup.

When the next cow comes in, the cup system is fitted on this cow and milking is resumed. It has, however, been found that the milk residues collecting can cause chemical or bacteriological contamination: in the teat cup, which can mean that, for example, infections are transmitted from one cow to another. It is therefore advisable to ensure that bacilli in the cup liner are avoided. Cleaning by hand is very time-consuming and laborious, and is therefore often not carried out in practice. The method of disinfecting described in the above-mentioned German Patent Application DE 2,622,794 also disinfects only a part of the interior of the teat cup, namely the part lying between the milk outflow aperture and the end of the teat in the teat cup.

SUMMARY OF THE INVENTION

The object of the invention is to provide a cleaning system which can be put into operation with little time loss and without much difficulty, so that each new cow can come into contact only with a completely cleaned cup system. This object is achieved according to the invention through the fact that the milk line from each teat cup at a point near the liner is provided with a branch which is connected by way of a shut-off valve to a line for the supply of a cleaning medium.

This measure ensures that each cup system which is in the release position can be cleaned by supplying a cleaning medium for a short time through the above-mentioned branch. The use of some excess pressure in the cleaning medium means that the shut-off valve can be opened by it and the cleaning carried out.

In an advantageous embodiment of the present device the medium supply lines of all teat cups of a system are connected to a collection unit to which at least one line for supply of the cleaning medium is also connected. This collection unit can be used by additionally connecting a line to it for the supply of a flushing and/or drying medium, such as water or compressed air. In this way cleaning can be carried out in two phases.

The sole right also extends to a teat cup for use in the device described above, which teat cup is provided in a manner which is known per se with a liner which is integral with at least a first part of a milk line. This teat cup is characterised in that a branch is present in this part of the milk line near the liner, in which branch a non-return valve opening in the direction of the milk line is fitted.

BRIEF DESCRIPTION OF THE DRAWING

The above features and further features of the invention which will be explained in greater detail later are explained with reference to the drawing, which shows an embodiment of the device, of a teat cup, and of a cup system.

FIG. 1 shows a part of the cow with a cup system fitted on the udder.

FIG. 2 shows the cup system of FIG. 1 in the idle position.

FIG. 4 shows a detail on an enlarged scale of the system from FIG. 2.

DESCRIPTION OF THE PREFERRED EMBODIMENT

Figures 3, 5:
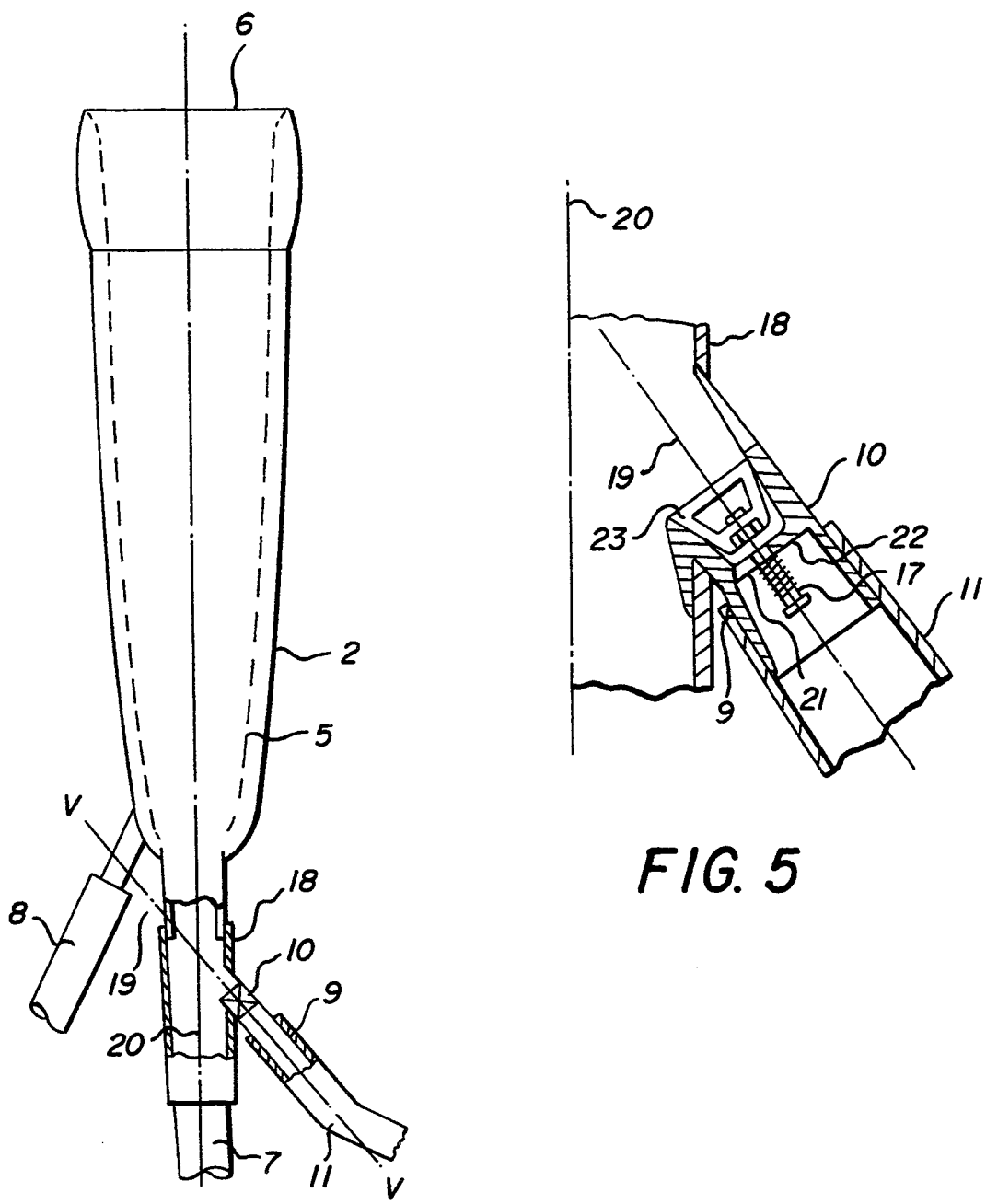
FIG. 3 shows on an enlarged scale a teat cup according to the present proposal.
FIG. 5 is a cross-section on a greatly enlarged scale along the line V—V in FIG. 3 of the non-return valve used therein.

FIG. 2 shows the cup system 1, which is in the so-called rest position, with the teat cups 2 hanging down. The same system is shown in FIG. 1 in the working phase, in which the teat cups 2 are placed on the teats (not visible) of the udder 3 of the cow 4.

FIG. 3 shows that each teat cup 2 is provided with a liner 5 which is open at the free end 6, and is connected at the other end to a milk line 7. Each cup 2 is provided with a connection 8 to a source (not shown) of alternating vacuum. Thus far the cup system 1 described corresponds to the known prior art.

The object of the present proposal is to provide an effective solution to the risk of undesirable pollution or even infection of the interior of the teat cups 2 during the idle period of the cup system 1 (situation shown in FIG. 2). For this purpose, the device is characterised in that the milk line 7 of each teat cup 2 is provided with a branch 9 at a place near the liner 5. This branch is provided with a shut-off valve 10, and is further connected to a line 11 for the supply of a cleaning medium. This shut-off valve 10 is designed in such a way that if any excess pressure occurs in the cleaning medium inside the line 11, said valve opens, so that the cleaning medium fed in can flush out the inside of the liner 5. The valve 10 will therefore generally be in the form of a non-return valve, as will be explained in greater detail with reference to FIG. 5.

The medium supply lines 11 of all teat cups 2 of a system 1 are connected to a distribution unit 12, as can be seen in FIG. 2, and as shown enlarged in FIG. 4. A narrow supply line 13 which connects a collection unit 14 to the distribution unit 12 runs to said distribution unit 12. This collection unit 14 is provided with three supply valves 15, to each of which a line 16 is connected. A cleaning medium can be fed in under pressure through one of the three lines 16, while flushing water and compressed air can be supplied through one of the other lines 16. The valves 15 can be controlled independently and can be operated electromagnetically and thereby receive a signal from a manually operated contact button. It is even possible to accommodate these valves 15 in a fully automatic programming which goes into action when the cup system 1 is removed from the udder 3 of a cow 4. After closure of the valves 15 the pressure inside the collection unit—and thus in the supply lines 11—falls off, and the non-return valves 10 can close under the influence of a spring 17 which is provided.

As can be seen best in FIG. 3, the branch 9 is situated in the first part 18 of the milk line 7, so that the cleaning and/or flushing medium fed in impinges directly on the inside wall of the liner 5, and from there it flows to the free end or mouth 6, at which last point the risk of pollution or infection is greatest. The non-return valve 10 is adjacent to this first part 18 of the milk line 7, and at the same time takes up a position such that the supply stream of cleaning medium passing through this valve has a direction component to the mouth 6 of the liner 5. In this position, the axis 19 of the non-return valve 10 is able to intersect the axis 20 of the milk line 7. This means that the cleaning fluid is squirted slightly tangentially, so that this medium will move helically along the inside of the line part 18 and then along the inside of the liner 5. This has a beneficial effect on the cleaning action of the medium.

FIG. 5 shows on an enlarged scale a longitudinal section of the non-return valve 10, which is of conical shape. This means that the supply stream of cleaning medium inside the part 18 of the milk line 7 will gush inwards in the form of a surface of a cone. A number of holes 21 in the guide wall 22 of the valve body 23 guarantee an adequate throughput of the cleaning medium from the line 11. In this connection it is pointed out that any suitable cleaning agent can be used, and that, under certain conditions, it is sufficient to flush the teat cups with clean water, it being possible to use compressed air finally for drying the inside of the liner 5.

The dairy farmer who is used to using a conventional pneumatic milking unit does not in this case need to make any change in his method, since the cleaning according to the present proposal is carried out during the non-active period of the cup system, i.e. in the situation shown in FIG. 2. The valves 15 can be opened and closed by means of remote-controlled operating devices 24 (see FIG. 4).

I claim:

1. A teat cup for pneumatic milking of cows comprising a liner which is open at one end and has another end connected to a milk line, said liner being integral with at least a portion of said milk line connected to said other end of said teat cup, means at said other end of said teat cup for connecting said teat cup to a source of alternating vacuum, a branch line connected to a source of cleaning medium and connected to said milk line at the connection to said teat cup, and a non-return valve in said branch line adjacent said milk line which opens only in a direction to permit a flow of cleaning medium into said milk line and into said teat cup.

2. A teat cup as claimed in claim 1 wherein said non-return valve is positioned such that a supply stream of cleaning medium passing there through has a direction component toward said open one end of said liner.

3. A teat cup as claimed in claim 1 wherein said non-return valve has a conical shape such that the supply stream of cleaning medium enters the milk line in the shape of the surface of a cone.

4. A teat cup as claimed in claim 1 wherein said non-return valve has a central longitudinal axis which intersects the central axis of the milk line.

5. A device for pneumatic milking of cows and comprising a plurality of teat cups, each of said teat cups comprising a liner which is open at one end and has another end connected to a milk line, said liner being integral with at least a portion of said milk line connected to said other end of said teat cup, means at said other end of said teat cup for connecting said teat cup to a source of alternating vacuum, a branch line connected to a source of cleaning medium and connected to said milk line at the connection to said teat cup, and a non-return valve in said branch line adjacent said milk line which opens only in a direction to permit a flow of cleaning medium into said milk line and into said teat cup.

6. A device as claimed in claim 5 and further comprising a collection unit and the branch lines of each of said teat cups being connected thereto, and a first supply line leading from a source of connecting medium and connected to said collection unit.

7. A device as claimed in claim 6 and further comprising a second supply line connected to said collection unit from a source of one of a flushing medium and a drying medium.

8. A device as claimed in claim 7 and further comprising independently controlled supply valves in said collection unit connected in said supply lines.

9. A method of cleaning a teat cup of a pneumatic milking machine for cows comprising the steps of removing a teat cup from the teat of the cow after completion of the milking cycle and positioning the teat cup with its open end directed downwardly, the other end of said teat cup being connected to a milk line, and introducing a cleaning medium into the milk line adjacent its connection to the teat cup at an angle intersecting the central axis of the teat cup and in a direction toward the open end of the teat cup to flush the interior thereof.

10. A method as claimed in claim 9 and the further step of blowing clean the interior of the teat cup after the flushing thereof with a cleaning medium.

* * * * *